United States Patent
Kurokawa

(10) Patent No.: US 12,400,431 B2
(45) Date of Patent: Aug. 26, 2025

(54) INFORMATION PROCESSING APPARATUS, ESTIMATION METHOD, TRAINING METHOD, AND STORAGE MEDIUM

(71) Applicant: CANON KABUSHIKI KAISHA, Tokyo (JP)

(72) Inventor: Kazunari Kurokawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 418 days.

(21) Appl. No.: 17/970,694

(22) Filed: Oct. 21, 2022

(65) Prior Publication Data

US 2023/0129274 A1   Apr. 27, 2023

(30) Foreign Application Priority Data

Oct. 26, 2021   (JP) .................................. 2021-174764

(51) Int. Cl.
G06V 10/774   (2022.01)
G06T 3/4046   (2024.01)
G06V 10/82    (2022.01)
G06V 10/26    (2022.01)

(52) U.S. Cl.
CPC .......... *G06V 10/774* (2022.01); *G06T 3/4046* (2013.01); *G06V 10/82* (2022.01); *G06V 10/26* (2022.01)

(58) Field of Classification Search
None
See application file for complete search history.

(56) References Cited

U.S. PATENT DOCUMENTS

| | | | |
|---|---|---|---|
| 8,600,162 B2 | 12/2013 | Tanase | |
| 8,855,368 B2 | 10/2014 | Tanase | |
| 2007/0081231 A1 | 4/2007 | Shirota et al. | |
| 2007/0126868 A1 | 6/2007 | Kiyohara et al. | |
| 2007/0279696 A1 | 12/2007 | Matsuzaka | |

(Continued)

FOREIGN PATENT DOCUMENTS

| | | |
|---|---|---|
| EP | 2528020 A2 | 11/2012 |
| JP | 2003-141543 A | 5/2003 |

(Continued)

OTHER PUBLICATIONS

Yoshihito Kokubo, et al., "Fine-grained Pedestrian Classification by Fusing Multiple CNN Models," IEICE Technical Report, The Institute of Electronics, Information and Communication Engineers, Feb. 11, 2017, vol. 116, No. 462, pp. 81-85.

(Continued)

*Primary Examiner* — Leon Flores
(74) *Attorney, Agent, or Firm* — Venable LLP

(57) ABSTRACT

An information processing apparatus includes an image acquiring unit that acquires a plurality of narrow-area images which are respectively images of parts of a target image and include mutually different ranges of the target image and a wide-area image which is an image having an information amount of the target image and includes a range of the target image larger than that included in each of the plurality of narrow-area images, and an information acquiring unit that acquires information correlated with the target image from a learning model to which the plurality of narrow-area images and the wide-area image are input.

27 Claims, 10 Drawing Sheets

(56) References Cited

U.S. PATENT DOCUMENTS

| | | |
|---|---|---|
| 2012/0300982 A1 | 11/2012 | Tanase |
| 2012/0301015 A1 | 11/2012 | Tanase |
| 2017/0202483 A1 | 7/2017 | Sorimoto et al. |
| 2020/0118263 A1 | 4/2020 | Nogami et al. |
| 2020/0175672 A1 | 6/2020 | Tanaka |
| 2021/0065351 A1 | 3/2021 | Yamaji et al. |
| 2021/0082127 A1 | 3/2021 | Yano et al. |
| 2021/0133979 A1 | 5/2021 | Takahashi |
| 2021/0183012 A1 | 6/2021 | Matsumoto et al. |
| 2021/0312605 A1 | 10/2021 | Nogami |
| 2021/0350570 A1 | 11/2021 | Hibi et al. |
| 2021/0358129 A1 | 11/2021 | Takahashi et al. |
| 2023/0162343 A1 | 5/2023 | Ikeda |
| 2024/0236496 A1* | 7/2024 | Miyazaki ........... G02B 13/0065 |

FOREIGN PATENT DOCUMENTS

| | | |
|---|---|---|
| JP | 2012-243197 A | 12/2012 |
| JP | 2016-115313 A | 6/2016 |
| JP | 2018-097506 A | 6/2018 |
| JP | 2020-003837 A | 1/2020 |
| JP | 2020-024612 A | 2/2020 |
| JP | 2020-085965 A | 6/2020 |
| JP | 2020-187693 A | 11/2020 |
| JP | 2021-144589 A | 9/2021 |
| JP | 2021-179905 A | 11/2021 |

OTHER PUBLICATIONS

May 27, 2025 Japanese Official Action in Japanese Patent Appln. No. 2021-174764.

* cited by examiner

INFORMATION PROCESSING APPARATUS, ESTIMATION METHOD, TRAINING METHOD, AND STORAGE MEDIUM

BACKGROUND OF THE INVENTION

Field of the Invention

The present invention relates to an information processing apparatus, an estimation method, a training method, and a storage medium.

Description of the Related Art

It has been performed to use a learning model trained in advance to estimate a predetermined result on the basis of an optional image.

Japanese Patent Application Publication No. 2020-187693 proposes a technology in which, when a predetermined result is to be estimated on the basis of an entire image, a broad-perspective determination is made by using the entire image, and then a detailed determination is made on the basis of a result of the broad-perspective determination and partial images cut out of the entire image.

SUMMARY OF THE INVENTION

An aspect of the present invention is an information processing apparatus including at least one memory and at least one processor which function as an image acquiring unit configured to acquire 1) a plurality of narrow-area images which are respectively images of parts of a target image and include mutually different ranges of the target image and 2) a wide-area image which includes a range of the target image larger than that included in each of the plurality of narrow-area images, the wide-area image having an information amount to be smaller than that of the target image; and an information acquiring unit configured to acquire information correlated with the target image from a learning model to which the plurality of narrow-area images and the wide-area image are input.

An aspect of the present invention is an information processing apparatus including at least one memory and at least one processor which function as an image acquiring unit configured to acquire 1) a plurality of narrow-area images which are respectively images of parts of a target image and include mutually different ranges of the target image and 2) a wide-area image which includes a range of the target image larger than that included in each of the plurality of narrow-area images, the wide-area image being obtained by reducing an information amount of the target image; and a training unit configured to train a learning model on a basis of the plurality of narrow-area images, the wide-area image, and information correlated with the target image.

An aspect of the present invention is an estimation method including: an image acquiring step of acquiring 1) a plurality of narrow-area images which are respectively images of parts of a target image and include mutually different ranges of the target image and 2) a wide-area image which includes a range of the target image larger than that included in each of the plurality of narrow-area images, the wide-area image having an information amount to be smaller than that of the target image; and an information acquiring step of acquiring information correlated with the target image from a learning model to which the plurality of narrow-area images and the wide-area image are input.

An aspect of the present invention is a training method including: an image acquiring step of acquiring 1) a plurality of narrow-area images which are respectively images of parts of a target image and include mutually different ranges of the target image and 2) a wide-area image which includes a range of the target image larger than that included in each of the plurality of narrow-area images, the wide-area image being obtained by reducing an information amount of the target image; and a training step of training a learning model on a basis of the plurality of narrow-area images, the wide-area image, and information correlated with the target image.

Further features of the present invention will become apparent from the following description of exemplary embodiments with reference to the attached drawings.

DESCRIPTION OF THE EMBODIMENTS

Figure 1:
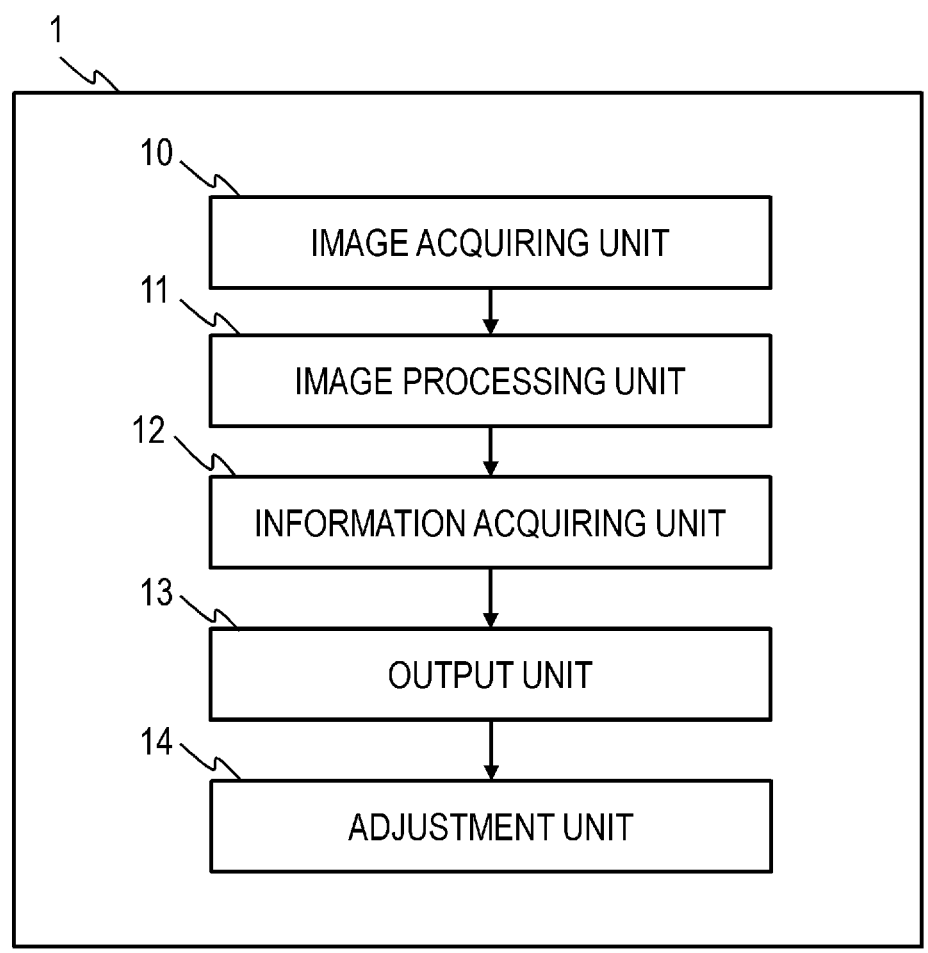
FIG. 1 is a configuration diagram of an information processing apparatus according to a first embodiment.

According to Japanese Patent Application Publication No. 2020-187693, when the entire image has a high resolution, the entire image may include plenty of information unnecessary for training and estimation.

Consequently, when the entire image is used directly for the training and estimation, the learning model may incur significant calculation cost, and estimation accuracy may deteriorate.

It is therefore an object of the present invention to reduce, when training or estimation is performed using a learning model, cost of calculation in the learning model and improve estimation accuracy.

Referring to the drawings, embodiments for implementing the present invention will be described. The following embodiments are not intended to limit the present invention, and not all combinations of features described in the embodiments are essential to the present invention. In addition, the following first to third embodiment examples can freely be combined with each other as long as no contradiction occurs.

First Embodiment

FIG. 1 is a configuration diagram of an information processing apparatus 1 according to the first embodiment.

The information processing apparatus 1 trains a learning model in a training phase and estimates information correlated with (corresponding to) an input image (target image) in an estimation phase. Accordingly, it can be considered that, in the training phase, the information processing apparatus 1 is a training apparatus and, in the estimation phase, the information processing apparatus 1 is an estimation apparatus.

The information estimated by the information processing apparatus 1 from the input image may be any information. The estimated information is information related to the future of a target shown in the image, information related to the past of the target shown in the image, features (such as physical properties or attributes) of the target shown in the image, or the like. In the training for the estimation, a pair of a supervisory image and highly accurate supervisory information corresponding to the supervisory image may appropriately be input to cause a correlation between the image and the information to be learned. Note that the input image may be a design image obtained by modelling an object, an RGB image obtained by imaging a subject, a distance image in which each of pixels indicates a distance to the subject, and a temperature image in which each of pixels indicates a temperature of the subject.

For example, the information processing apparatus 1 may estimate production cost (manufacturing cost) of a product from an image from which a shape of the product (an item to be manufactured; manufacturing object) can be recognized. The information processing apparatus 1 may also estimate a completion time and a work period from an image representing progress at a construction site, a product manufacturer, or the like. The information processing apparatus 1 may also estimate an age of a person from a face photograph of the person. The information processing apparatus 1 may also estimate, from an image obtained by diagnostic imaging such as CT, an incidence rate of a disease or life-related information such as a survival rate from the disease or a life duration.

The information processing apparatus 1 may also estimate a calorie or an expiration date of food from an image of the food. The information processing apparatus 1 may also estimate a degree of deterioration of an object, such as a building or furniture, from an image of the object. For example, the degree of deterioration is a remaining service life of the object or a value when it is assumed that a value of a brand-new product is 0% and a value of a defective product is 100%. The information processing apparatus 1 may also estimate a price of a good, such as a car or a house, from an image of the good, and the price in this case may be any of a sale price (purchase price), a resale price, and the like. The information processing apparatus 1 may also estimate a fishery yield from an image of a tidal current. The information processing apparatus 1 may also estimate weather-related information such as a precipitation amount and a time when a typhoon is at closest approach from a weather image. The information processing apparatus 1 may also estimate a type and a state (a body length and a body weight) of a living object from an image of the living object. The state of the living object to be estimated may be any of a current state, a past state, and a future state. The information processing apparatus 1 may also estimate a material ratio of a product from a scanned image of the product. The information processing apparatus 1 may also estimate a photographing date from a photographed image of a person or scenery.

The information processing apparatus 1 may also estimate a future price from an image of a graph (chart) showing previous price fluctuations, and the price in this case may be a price of any of a movable estimate, an immovable estimate, a negotiable instrument, or an article of commerce (product or service). The information processing apparatus 1 may also estimate a condition of a living object such as a horse or a person from an image of the living object or may also estimate a short-term or long-term future potential thereof on the basis of the condition. For example, the short-term future potential of a racehorse is a winning percentage or an expected time in the next race, while the long-term future potential of the horserace is a winning percentage or the number of wins in a race in the next year.

The information processing apparatus 1 may also estimate a distance from a camera to a subject such as a living object or a building from an RGB image obtained by imaging the subject with the camera. The information processing apparatus 1 may also estimate a condition of a space (a concentration of each of liquids and gases in the space or a humidity or a temperature in the space) from an image obtained by imaging the space. The information processing apparatus 1 may also estimate information (such as, e.g., the number of a specified living object such as a deer or a bear and an average age of trees) on a living object living at a specified place such as a forest or a river from an image of the specified place.

The information processing apparatus 1 includes an image acquiring unit 10, an image processing unit 11, an information acquiring unit 12, an output unit 13, and an adjustment unit 14.

The image acquiring unit 10 acquires an input image (target image) obtained by imaging an optional subject. The input image may be a photograph resulting from photographing with a digital camera or an image captured from a 3D-CAD model. For example, the input image may be an image obtained by viewing a three-dimensional (3D) object in a single direction or may also be a multi-view image obtained by viewing the 3D object from a plurality of viewpoints (multiple viewpoints). In addition, as a format of the input image, various formats such as JPEG and PNG can be assumed, and any of the formats may be used. The image acquiring unit 10 stores the input image in a specified file storage place.

The image processing unit 11 performs image processing on the input image acquired by the image acquiring unit 10, and outputs the image after being subjected to the image processing to the information acquiring unit 12. The image processing unit 11 performs, as the image processing, acquisition of a plurality of divided images (narrow-area images) corresponding to images of parts of the input image and acquisition of one compressed image (wide-area image) resulting from a reduction in an information amount of the input image.

The information acquiring unit 12 acquires information (output data) output from the learning model as a result of inputting of the image after being subjected to the image processing by the image processing unit 11 to the learning model. When the learning model is already trained, the information acquiring unit 12 can acquire, from the learning model, an estimation result corresponding to (correlated with) the input image as the output data. Details of the learning model will be described later with reference to FIGS. 5 and 6.

The output unit 13 outputs the output data acquired by the information acquiring unit 12. Accordingly, when the information acquiring unit 12 has acquired the estimation result as the output data, the output unit 13 outputs the estimation result.

The adjustment unit 14 adjusts (trains) the learning model on the basis of each of the output data acquired by the information acquiring unit 12 and correct answer data (correct answer information to be acquired by the information acquiring unit 12) in the training phase. The correct answer data is information prepared in advance in association with the input image. The correct answer data need not necessarily be precise information, and may appropriately be feasible information correlated with the input image. For example, correct answer data associated with the input image showing a building having a height of 10.5 m and representing the height of the building may be a value indicating a precise height of 10.5 m or may also be a value indicating an approximate height of 10 m. Note that the adjustment unit 14 is a component operating in the training phase, and does not operate in the estimation phase. Accordingly, in the training phase, it is possible to train the learning model on the basis of the plurality of divided images, the compressed image, and the correct answer data by passing through the information acquiring unit 12, the output unit 13, and the adjustment unit 14. Therefore, in the training phase, a combination of the information acquiring unit 12, the output unit 13, and the adjustment unit 14 can be referred to as a training unit.

Image Processing Unit

Figure 2:
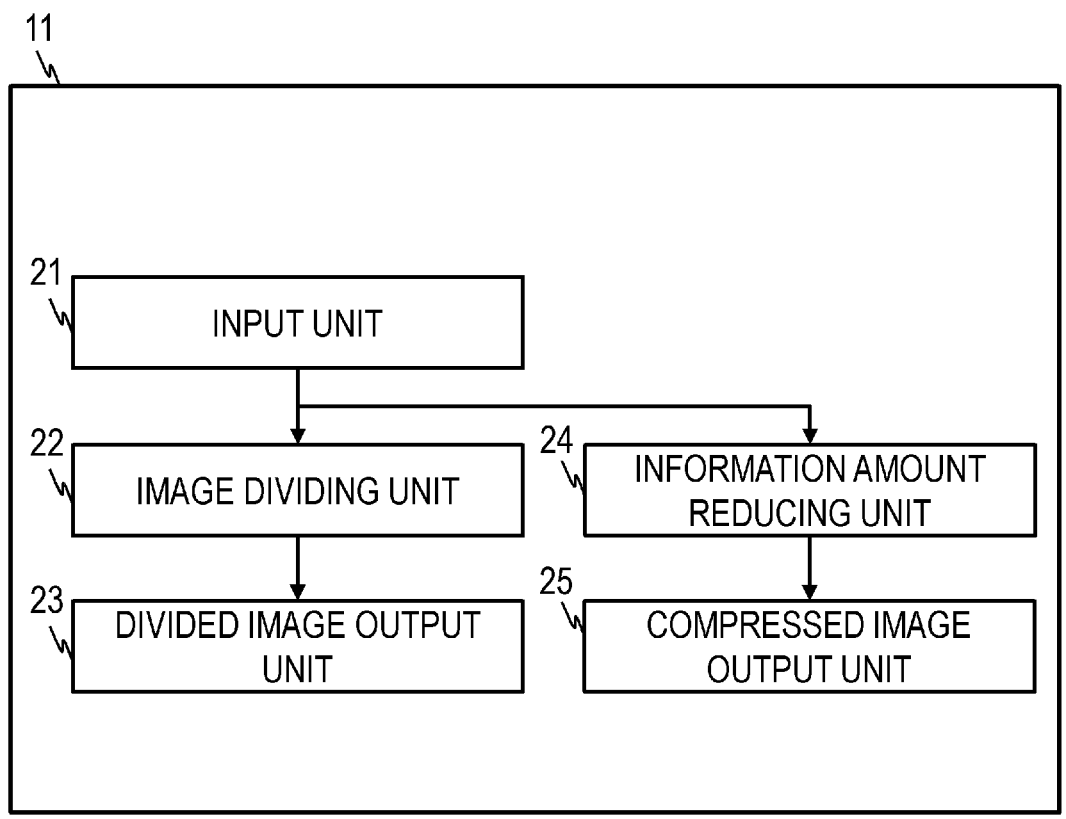
FIG. 2 is an internal configuration diagram of an image processing unit according to the first embodiment.

Referring to FIG. 2, an internal configuration of the image processing unit 11 will be described in detail. The image processing unit 11 includes an input unit 21, an image dividing unit 22, a divided image output unit 23, an information amount reducing unit 24, and a compressed image output unit 25.

The input unit 21 acquires the input image stored by the image acquiring unit 10 and develops the input image on a memory. As necessary, the input unit 21 may also perform optional processing (adjustment of a resolution, trimming, or adjustment of a color tone) on the input image. Note that, in the present specification, the resolution indicates a screen resolution (the total number of pixels) representing a product of the number of pixels in a vertical direction and the number of pixels in a lateral direction. Accordingly, deterioration of the resolution of a certain image has the same meaning as a reduction in the number of pixels in the certain image.

Figure 3:
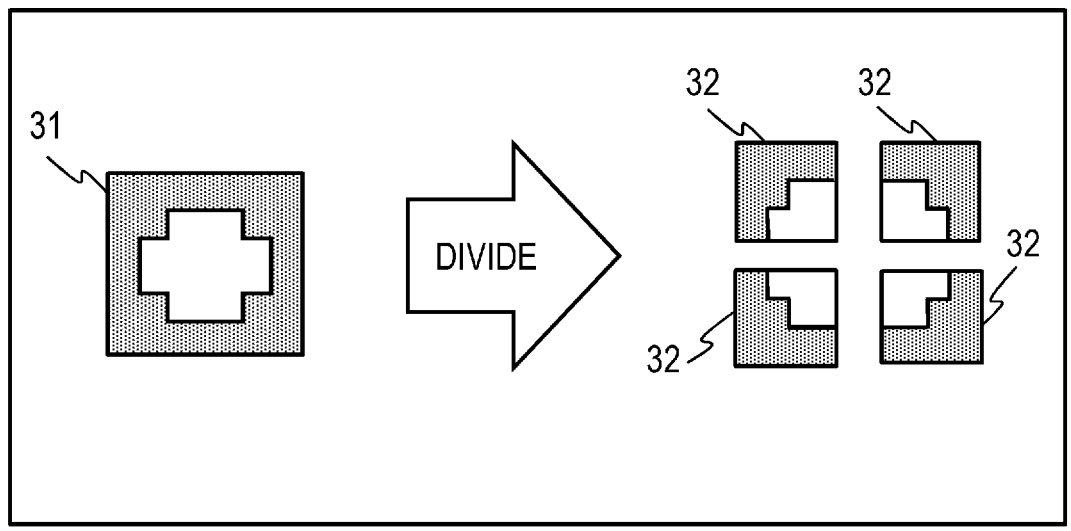
FIG. 3 is a diagram illustrating generation of divided images according to the first embodiment.

The image dividing unit 22 divides the input image developed on the memory by the input unit 21. For example, as illustrated in FIG. 3, the image dividing unit 22 generates four divided images 32 resulting from division of the input image 31 into four pieces. Note that the image dividing unit 22 generates the divided images 32 such that the resolution of the divided images 32 matches a resolution defined in a divided image input unit 51 of the information acquiring unit 12. When the information acquiring unit 12 thus uses the plurality of divided images obtained by dividing the input image, it is possible to capture detailed features of the input image.

When the image dividing unit 22 is capable of detecting characteristic portions of the input image 31, the image dividing unit 22 may also partially cut out only the characteristic portions instead of dividing the input image 31. In this case, the image dividing unit 22 causes a resolution of each of a plurality of cut-out images (narrow-area images) to match the resolution defined in the divided image input unit 51. The plurality of cut-out images may appropriately include partial ranges of the input image 31 which are not common to each other (ranges different from each other). The plurality of cut-out images may or may not include the ranges common to each other (the same range). In this manner, the input image may include ranges of the target image which are respectively and exclusively included in the plurality of cut-out images.

Note that the input image developed on the memory by the input unit 21 can be used by each of the image dividing unit 22 and the information amount reducing unit 24 without interference between processing in the image dividing unit 22 and processing in the information amount reducing unit 24. In other words, even when the image dividing unit 22 divides the input image to generate the divided images, the information amount reducing unit 24 can use the undivided input image. In addition, even when the information amount reducing unit 24 reduces the information amount of the input image to generate the compressed image, the image dividing unit 22 can use the input image having the unreduced information amount.

The divided image output unit 23 stores the plurality of divided images generated by the image dividing unit 22 in a specified file storage place to allow the information acquiring unit 12 to use the plurality of divided images. It is to be noted herein that, to train the learning model, the information acquiring unit 12 may input an image used for previous training to the learning model again and obtain the output data from the learning model. Therefore, by storing the plurality of divided images in the specified file storage place, the divided image output unit 23 need not generate the divided images again every time the learning model is trained. However, the divided image output unit 23 is not limited thereto, and may also generate divided images required for current training every time the learning model is trained and output the divided images to the information acquiring unit 12.

Figure 4:
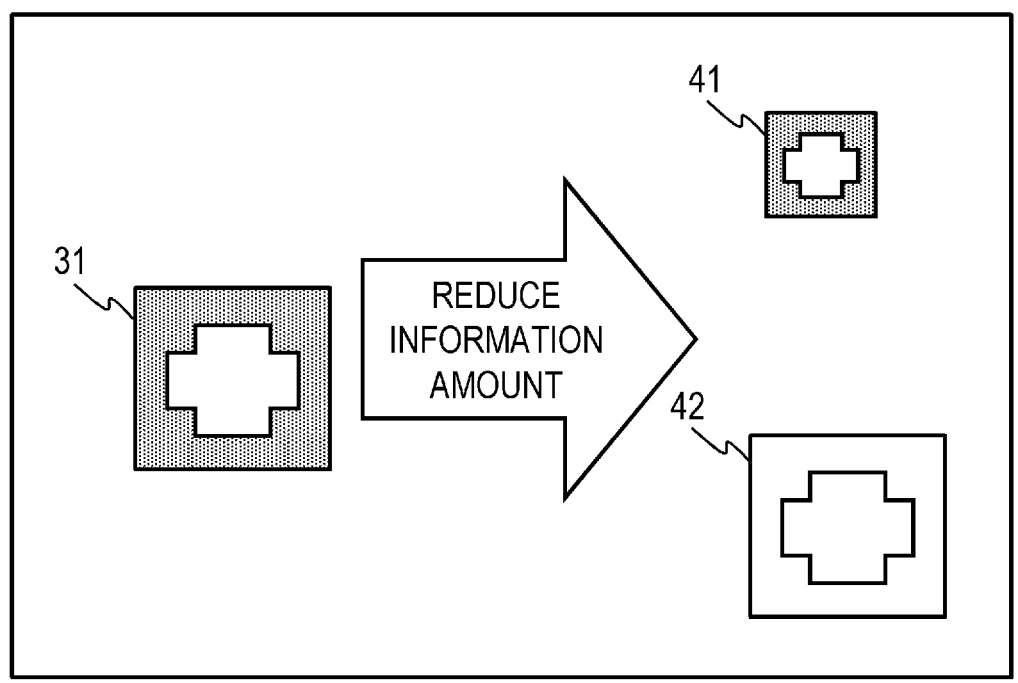
FIG. 4 is a diagram illustrating generation of a compressed image according to the first embodiment.

The information amount reducing unit 24 generates the compressed image corresponding to an image obtained by reducing (compressing) the information amount of the input image developed on the memory by the input unit 21. For example, as illustrated in FIG. 4, the information amount reducing unit 24 reduces the resolution of the input image 31 (reduces a size of the input image 31) to generate a compressed image 41. As illustrated in FIG. 4, the information amount reducing unit 24 may also convert the input image 31, which is an RGB color image, to a grayscale image or binarize the input image 31 to generate a compressed image 42 having a reduced color information amount (reduced color information). Note that the information amount reducing unit 24 may also reduce the resolution of the input image and further reduce the color information thereof to generate the compressed image. Alternatively, the information amount reducing unit 24 may also trim (extract) a part of the input image to generate the compressed image. In this case, the compressed image may appropriately include a range of the input image which is larger than a range included in each of the plurality of divided images. Note that the compressed image may appropriately include ranges of the input image which are included in the plurality of divided images without being shared (with no overlaps) (the range of each of the plurality of divided images which overlaps none of the ranges of the other divided images). The compressed image may also include all the ranges of the input image that are included in the plurality of divided regions.

When the information acquiring unit 12 thus uses the compressed image obtained by reducing the information amount of the input image, it is possible to capture broad-perspective features of the input image. Moreover, since the information amount of the compressed image is smaller than the information amount of the input image, cost of calculation in the information acquiring unit 12 in the training phase and the estimation phase can more significantly be reduced than when the input image is used as it is. As a result, it is possible to reduce the cost of calculation in the information processing apparatus 1 in training and estimation.

The compressed image output unit 25 stores, in the specified file storage place, the compressed image resulting from the reduction of the information amount by the information amount reducing unit 24. Note that, when there is no match between a resolution defined in a compressed image input unit 53 of the information acquiring unit 12 and a resolution of the compressed image, the compressed image output unit 25 adjusts the resolution of the compressed image so as to provide a match between the two resolutions, and then stores the compressed image in the specified file storage place.

The resolution (the number of pixels) defined in the divided image input unit 51 and the resolution defined in the compressed image input unit 53 may be the same as or different from each other. In other words, the resolution of the divided images and the resolution of the compressed image may be the same as or different from each other. For example, when the resolution of the compressed image is smaller than the resolution of the divided images, it is possible to reduce cost of convolutional processing on the compressed image described later. Note that the resolution defined in the divided image input unit 51 and the resolution defined in the compressed image input unit 53 depend on an amount of information that can be input to the learning model, and therefore can freely be changed by modifying design of the learning model (CNN).

Note that, when the image acquiring unit 10 can acquire the plurality of divided images and the compressed image instead of the input image, the information processing apparatus 1 need not necessarily include the image processing unit 11. In this case, the image acquiring unit 10 outputs the plurality of divided images and the compressed image to the information acquiring unit 12.

Information Acquiring Unit

Figure 5:
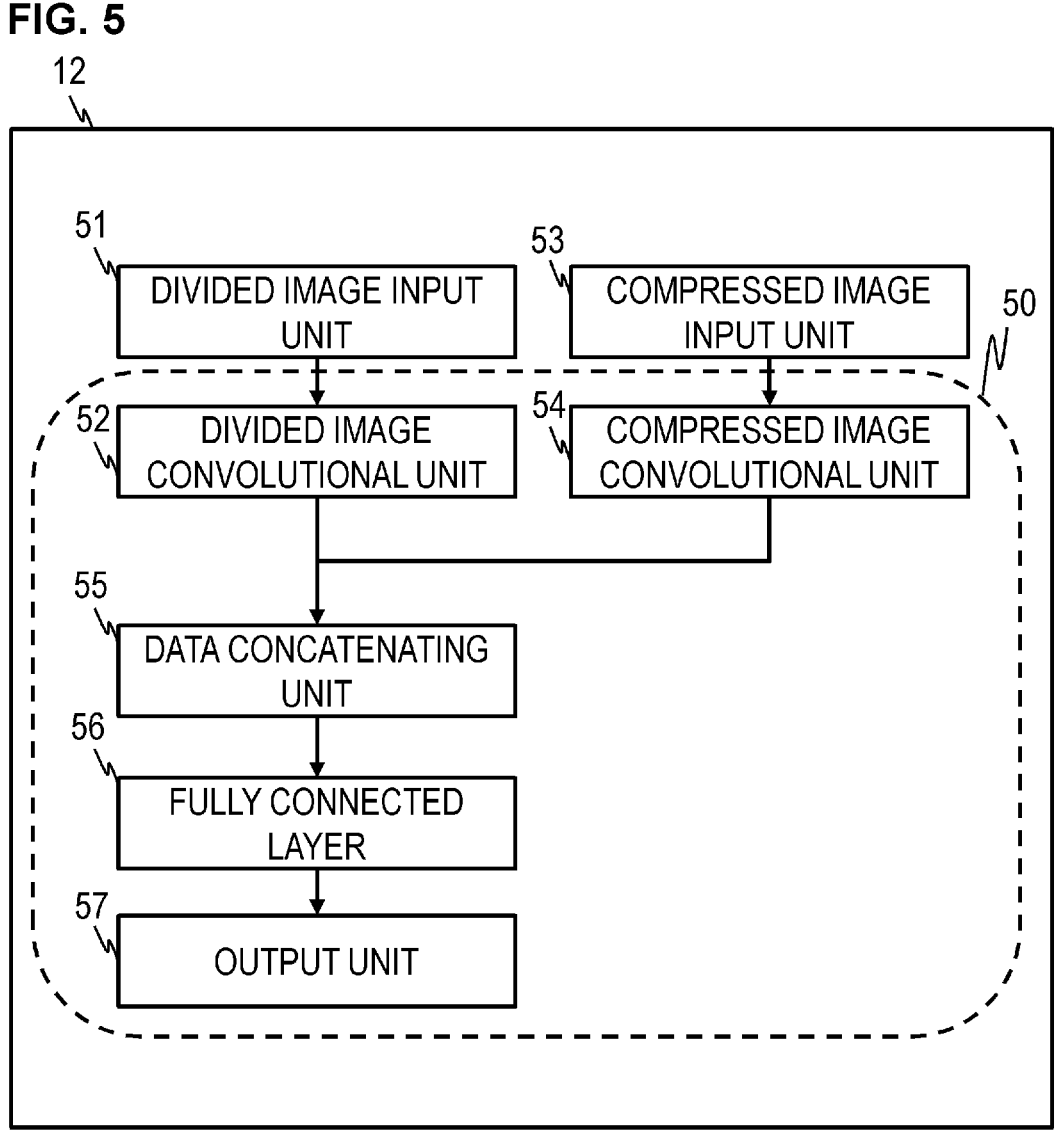
FIG. 5 is an internal configuration diagram of an information acquiring unit according to the first embodiment.

Referring to FIG. 5, an internal configuration of the information acquiring unit 12 will be described in detail. The information acquiring unit 12 includes a learning model 50, the divided image input unit 51, and the compressed image input unit 53. The learning model 50 includes a divided image convolutional unit 52, a compressed image convolutional unit 54, a data concatenating unit 55, a fully connected layer 56, and an output unit 57.

The divided image input unit 51 acquires the plurality of divided images from the specified file storage place and develops the plurality of divided images on the memory. Each of the plurality of divided images developed by the divided image input unit 51 is represented by a multi-dimensional arrangement.

The divided image convolutional unit 52 performs the convolutional processing on information on the multi-dimensional arrangement of each of the divided images to output a result of performing the convolutional processing as an arrangement information set. The convolutional processing is performed for each of the divided images. In the convolutional processing, a unique filter is applied to each of a plurality of convolutional layers to allow the features of the input data to be stepwise captured. When a weight of the filter in each of the convolutional layers is adjusted, the arrangement information set output from the divided image convolutional unit 52 is changed. Thus, by adjusting the weight of the filter in the convolutional layer, the adjustment unit 14 is allowed to adjust the output data to be acquired by the information acquiring unit 12 from the learning model (i.e., train the learning model 50). In addition, it may also be possible to insert an activation function, a drop-out layer, or a pooling layer between the plurality of convolutional layers, and thereby allow more detailed features to be extracted or allow over-training to be prevented.

Note that, in the training phase, for the divided image convolutional unit 52, a technique (transfer learning) which uses a model already trained in advance by using a large number of images may also be used. By using the transfer learning, the divided image convolutional unit 52 can reduce a training time and improve estimation accuracy even when an amount of data to be used for training (training data) is small. As the preliminarily trained model, VGG16, Inception V3, ResNet-50, or the like can be used, and any model may be used.

The compressed image input unit 53 acquires the compressed image from the specified file storage place and develops the compressed image on the memory. The compressed image is represented by the multi-dimensional arrangement.

The compressed image convolutional unit 54 performs the convolutional processing on the information on the multi-dimensional arrangement of the compressed image, similarly to the divided image convolutional unit 52, and outputs a result of performing the convolutional processing as an arrangement information set. In the training phase, the compressed image convolutional unit 54 may also use the transfer learning.

The data concatenating unit 55 concatenates the arrangement information set output from the divided image convolutional unit 52 and the arrangement information set output from the compressed image convolutional unit 54 to generate one arrangement information set. The one arrangement information set refers to an information set (a set of information) in which a plurality of values of the same data type are handled as a cluster of variables. The divided image convolutional unit 52 performs the convolutional processing on each of the divided images, and consequently outputs the arrangement information set for each of the divided images. Accordingly, when these arrangement information sets are simply concatenated by the data concatenating unit 55, a degree of influence of the broad-perspective features that should be obtained from the compressed image is lowered. Therefore, the data concatenating unit 55 may also use a pooling layer or the like to combine the arrangement information sets of the plurality of divided images into one arrangement information set, and then concatenate the combined arrangement information set and the arrangement information set output from the compressed image convolutional unit 54. This allows a data size balance between the arrangement information set based on the divided images and the arrangement information set based on the compressed image to be adjusted.

The fully connected layer 56 further combines features represented by the arrangement information set generated by the data concatenating unit 55 together. The fully connected layer 56 is a layer in which neurons in an input layer and neurons in an output layer are fully connected to each other. In the fully connected layer 56, a plurality of layers are stacked to allow more complicated feature values to be extracted from the arrangement information set input thereto.

The output unit 57 summarizes the arrangement information set acquired from the fully connected layer 56 so as to produce output data including a predetermined number of elements. The number of elements in the output data is 1 when, e.g., one numerical value is intended to be output (estimated) and is 1000 when the output data is intended to be categorized into any of 1000 classes.

First Embodiment Example

The following will describe a first embodiment example as a specific example of the first embodiment. In the first embodiment example, a description will be given of the information processing apparatus 1 that estimates a working time of a mold piece included in a mold for plastic injection molding from an image (design image) of a mold (mold 3D shape) modelled by using a 3D-CAD.

Training Phase

Figure 6:
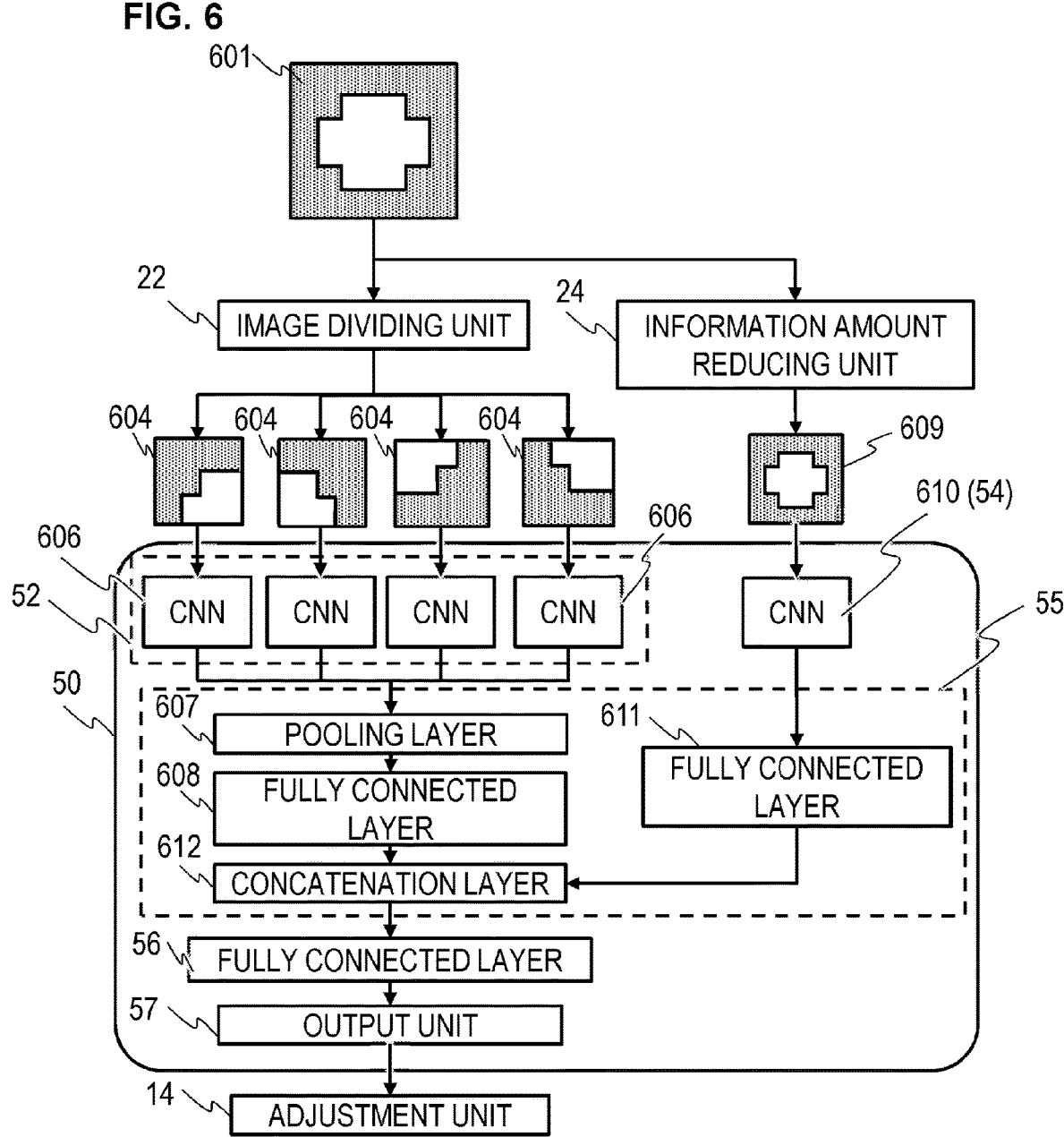
FIG. 6 is a diagram illustrating a training phase according to the first embodiment example.

First, referring to FIG. 6, a description will be given of the training phase (training method) corresponding to a phase in which the learning model 50 included in the information processing apparatus 1 is to be trained. FIG. 6 illustrates a flow of training of the learning model 50 by referring to some of the individual components of the information processing apparatus 1 described above.

An input image 601 is an image (target image) obtained by capturing the entire mold when the mold is viewed in a +Z-direction in an absolute coordinate system of the 3D-CAD. A resolution of the input image 601 is assumed to be a resolution which allows a shape of the mold to be recognized in the input image 601. Specifically, the resolution of the input image 601 is assumed to be 448×448.

The image dividing unit 22 and the information amount reducing unit 24 perform image processing on the input image 601 to generate an image usable in the learning model 50.

The image dividing unit 22 divides the input image 601 to generate a plurality of divided images 604. Since a resolution of an image to be input to the learning model 50 is assumed to be 224×224, the image dividing unit 22 divides the input image 601 having the 448×448 resolution into the four divided images 604 each having the 224×224 resolution.

The information amount reducing unit 24 reduces an information amount of the input image 601 to generate a compressed image 609. The information amount reducing unit 24 reduces the 448×448 resolution of the input image 601 to the 224×224 resolution to thereby reduce the information amount of the input image 601.

In the information acquiring unit 12, the four divided images 604 and the compressed image 609 are input to the learning model 50. The learning model 50 includes the divided image convolutional unit 52, the compressed image convolutional unit 54, the data concatenating unit 55, the fully connected layer 56, and the output unit 57.

Figure 7:
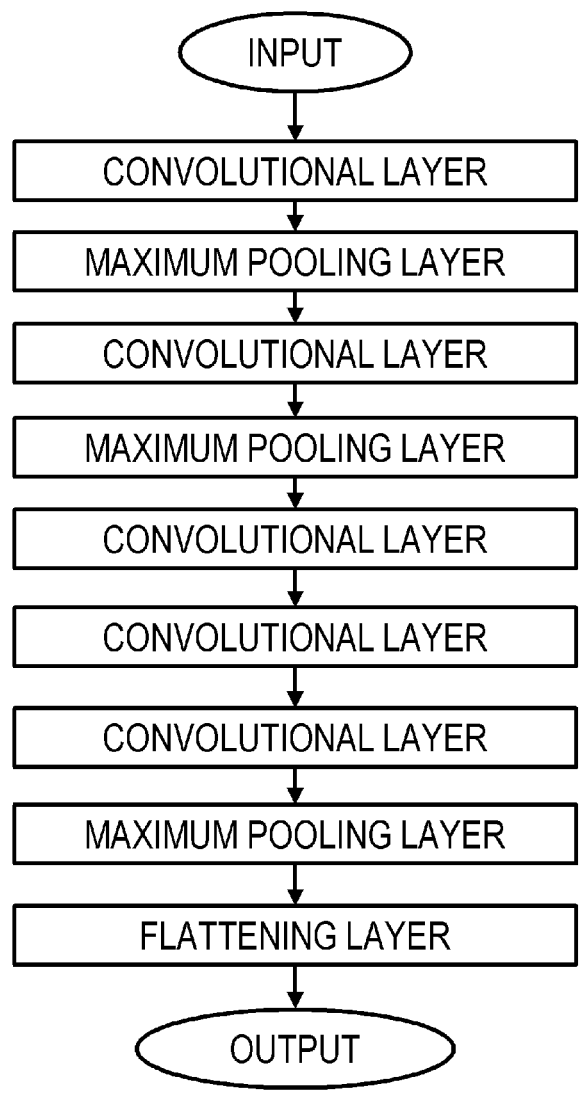
FIG. 7 is a diagram illustrating a CNN according to the first embodiment example.

The divided image convolutional unit 52 extracts features from each of the four divided images 604. The divided image convolutional unit 52 has four convolutional neural networks (CNN) 606. FIG. 7 illustrates an example of each of the convolutional neural networks 606. In the convolutional neural network 606, a plurality of convolutional layers, a plurality of pooling layers, and the like are connected in series to allow features to be extracted from an image input to the convolutional neural network 606.

To each of the convolutional neural networks 606, one of the divided images 604 generated by the image dividing unit 22 is input. At this time, the divided image 604 is an image having the 224×224 resolution, and has RGB color information. Accordingly, to the convolutional neural network 606, (224, 224, 3) arrangement information is input as the divided image 604. Then, in the convolutional neural network 606, the convolutional processing is performed, and one-dimensional arrangement information including 6400 elements is output.

The compressed image convolutional unit 54 has a convolutional neural network (CNN) 610. To the convolutional neural network 610, the compressed image 609 resulting from the reduction of the information amount by the information amount reducing unit 24 is input. The compressed image 609 has the 224×224 resolution and the RGB color information. Accordingly, to the convolutional neural network 610, as the compressed image 609, the (224, 224, 3) arrangement information is input. Then, similarly to the convolutional neural network 606 (see FIG. 7), the convolutional neural network 610 performs the convolutional processing or the like, and outputs the one-dimensional arrangement information including the 6400 elements.

The convolutional neural networks 606 and 610 may also use the transfer learning using the VGG16. In the VGG16, a model trained with a large-scale image set referred to as ImageNet is used and therefore, even when the amount of the training data is small, it is possible to improve the estimation accuracy in the estimation phase.

The data concatenating unit 55 includes a pooling layer 607, a fully connected layer 608, a fully connected layer 611, and a concatenation layer 612.

In the pooling layer 607, outputs (arrangement information sets) from the four convolutional neural networks 606 are combined into one. In the pooling layer 607, e.g., maximum pooling (processing of acquiring a maximum value from each of pooling regions) is performed. According to this, a one-dimensional arrangement information set including 6400 elements in which features in a (6400, 4) arrangement information set are emphasized is output. Note that, instead of the maximum pooling, average pooling (processing of acquiring an average value of each of the pooling regions or L2 pooling (processing of acquiring a root-mean-square of each of the pooling regions) may also be performed. In the present embodiment, an information amount of the arrangement information set output from the pooling layer 607 is the same as an information amount of the arrangement information set output from one of the convolutional neural networks 606. However, the information amount of the arrangement information set output from the pooling layer 607 may appropriately be smaller than a total of the information amounts of the arrangement information sets output from the four convolutional neural networks 606. In this case, for example, the information amount of the arrangement information set output from the pooling layer 607 is not less than the information amount of the arrangement information set output from one of the convolutional neural networks 606. Note that an information amount of an arrangement information set can be considered to be the number of elements in an arrangement.

Each of the fully connected layer 608 and the fully connected layer 611 further connects features of the one-dimensional arrangement information sets input thereto. The number of elements in the arrangement information set output from each of the fully connected layer 608 and the fully connected layer 611 may also be changed depending on degrees of importance of features in the input image 601. When a working time is to be estimated from an image of the mold according to the first embodiment example, it can be considered that detailed features obtained from the four divided images 604 and the broad-perspective features obtained from the one compressed image 609 are equally important (have the same degree of importance). Accordingly, the numbers of elements in the respective arrangement information sets output from the fully connected layer 608 and the fully connected layer 611 are equal. Specifically, in the fully connected layer 608, the arrangement information sets are connected so as to reduce the number of elements in the arrangement information set representing the features in each of the four divided images 604 from 6400 to 1024. Additionally, in the fully connected layer 611, the arrangement information sets are connected so as to reduce the number of elements in the arrangement information set representing the features in the one compressed image 609 from 6400 to 1024.

The concatenation layer 612 concatenates the one-dimensional arrangement information set (first information) output from the fully connected layer 608 and the one-dimensional arrangement information set (second information) output from the fully connected layer 611 in series, and outputs an arrangement information set resulting from the concatenation. In the first embodiment example, the one-dimensional arrangement information set including 1024 elements is output from each of the fully connected layers 608 and 611, and accordingly the concatenation layer 612 outputs the one-dimensional arrangement information set including 2048 elements.

The fully connected layer 56 further connects features represented by the arrangement information set output from the concatenation layer 612.

The output unit 57 changes the number of elements in the arrangement information set output from the fully connected layer 56 on the basis of information estimated by the information processing apparatus 1 in the estimation phase. In the first embodiment example, the information processing apparatus 1 estimates the working time in the estimation phase, and accordingly the output unit 57 outputs an arrangement information set including one element. This allows the information acquiring unit 12 to acquire the output data according to the input image 601 from the learning model 50 to which the four divided images 604 and the one compressed image 609 are input.

The adjustment unit 14 trains the learning model 50 on the basis of the output data output from the learning model 50 (output unit 57) and correct answer information (correct answer data or supervisory data) to be output from the learning model 50. Specifically, the adjustment unit 14 adjusts the weights of the filters of the convolutional neural networks 606 and 610 (convolutional layers) so as to minimize a value of a loss function representing a degree of an error between the output data and the correct answer data for the plurality of input images. When the weights of the filters of the convolutional neural networks 606 and 610 are adjusted, the output data output from the learning model 50 changes, and therefore it is possible to update the value of the loss function. Thus, by adjusting the weights of the filters of the convolutional neural networks 606 and 610, the adjustment unit 14 can change the learning model 50 to a trained model that has been completely trained. Note that, as the loss function, a mean absolute percentage error described later with reference to Expression 1 can be used. Alternatively, as the loss function, a square sum error or a cross-entropy error may also be used instead.

In the first embodiment example, for example, a user combines an input image representing the mold and actual information (correct answer data) on the working time corresponding to the input image into one training data set, and prepares about a total of the 1000 sets in advance. Then, the adjustment unit 14 performs the training described above on a GPU-mounted work station. In the training, the user may also adjust the number of training epochs or a batch size so as to allow high-accuracy estimation to be performed in the estimation phase.

Estimation Phase

Figure 8:
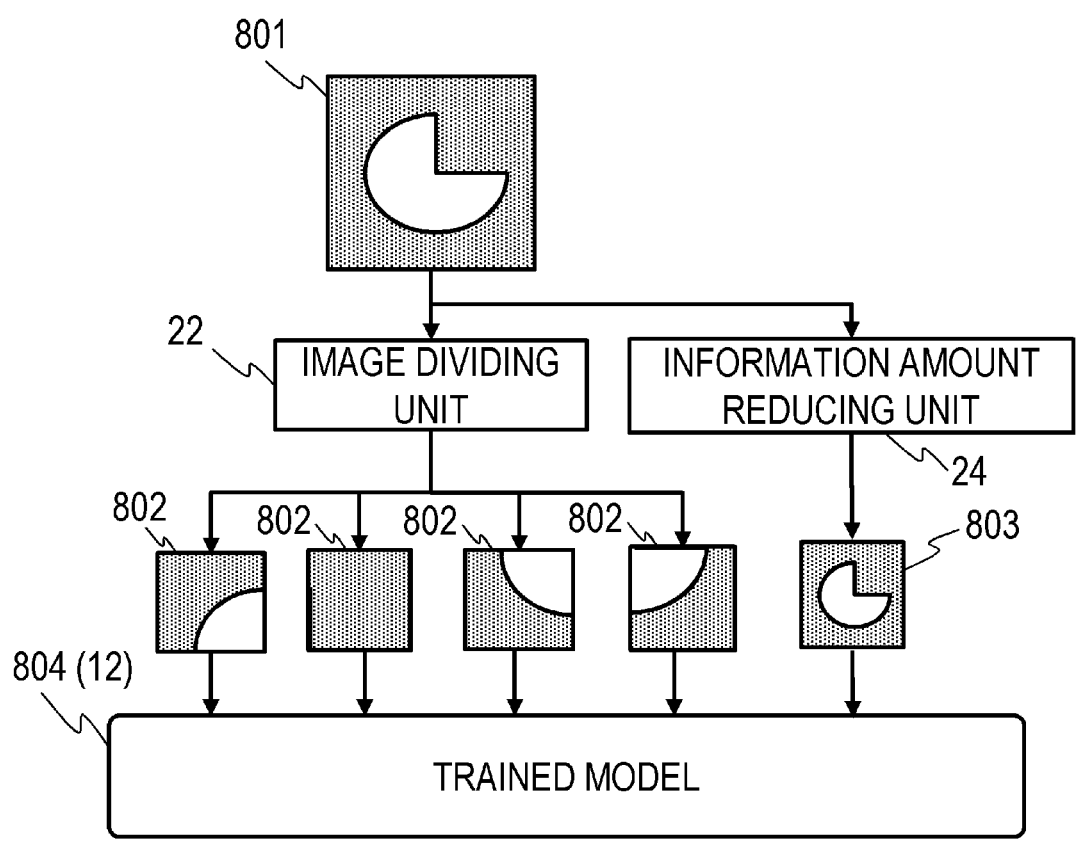
FIG. 8 is a diagram illustrating an estimation phase according to the first embodiment example.

Subsequently, referring to FIG. 8, a description will be given of processing of estimating the working time (estimation phase or estimation method) by using a trained model 804 obtained by training the learning model 50 in the training phase.

The input image 801 is an input image of the mold obtained by capturing mold 3D shape data in the +Z-direction in the absolute coordinate system. Color information of the input image 801 is held in an RGB format. A resolution of the input image 801 is 448×448.

The image dividing unit 22 divides the input image 801 into four pieces to generate four divided images 802 each having the 224×224 resolution. This allows the information acquiring unit 12 to easily obtain the detailed features in the input image 801 from the four divided images 802.

The information amount reducing unit 24 reduces the resolution of the input image 801 to generate a compressed image 803. Specifically, the information amount reducing unit 24 generates the compressed image 803 by reducing the input image 801 so as to achieve the 224×224 resolution. This allows the information acquiring unit 12 to easily obtain the broad-perspective features in the input image 801 from the compressed image 803.

The information acquiring unit 12 has the trained model 804. The trained model 804 is a model obtained by training the learning model 50 in the training phase. To the trained model 804, the four divided images 802 and the one compressed image 803 are input, and consequently the information acquiring unit 12 outputs the mold working time as an estimation result (estimation value). Note that the estimation result may be written in a log file, or may also be displayed on a screen of a display unit of the information processing apparatus 1.

As an index for evaluating accuracy of the estimation result (estimation performance of the information processing apparatus 1), the mean absolute percentage error with respect to an actual value (correct answer data) of the working time can be used. The mean absolute percentage error indicates that, as a numerical value is lower, higher-accuracy estimation is performed successfully. Expression 1 represents a method of calculating a mean absolute percentage error M. In Expression 1, n represents the number of input images, t represents a value (identifier) that identifies the input image, At represents an actual value corresponding to the identifier t, and Ft represents the estimation result (estimation value) corresponding to the identifier t. In the first embodiment example, as the mean absolute percentage error M, 32.4% could be obtained.

$$M = \frac{100\%}{n} \sum_{t=1}^{n} \left| \frac{A_t - F_t}{A_t} \right| \qquad \text{Expression 1}$$

Second Embodiment Example

As a second embodiment example corresponding to a specific example of the first embodiment, a description will be given of an example in which, in the information processing apparatus 1 according to the first embodiment example, instead of the compressed image (wide-area image) obtained by reducing the resolution of the input image (target image), a compressed image obtained by reducing the color information of the input image is used. Note that the following will describe only a difference between the second embodiment example and the first embodiment example, and a description of details of the second embodiment example that are the same as those of the first embodiment example is omitted.

In the second embodiment example, in the training phase illustrated in FIG. 6, the information amount reducing unit 24 generates the compressed image 609 by reducing the color information of the input image 601. In the second embodiment example, the input image 601 has the 448×448 resolution, and is formed in the RGB format. Since the input image 601 is an image generated from the mold 3D shape data, various colors for causing tolerance information and various attributes to be recognized are added thereto. However, it can be said that, to obtain features of the broad-perspective shape in the input image 601, color is unnecessary information. Accordingly, the information amount reducing unit 24 converts the input image 601 into a grayscale format and thereby generates the compressed image 609 having reduced color information. This allows features to be more efficiently obtained from the compressed image 609.

To the convolutional neural network 610 (learning model 50), unlike in the first embodiment example, the compressed image 609 having the 448×448 resolution is input. Specifically, the compressed image 609 has the 448×448 resolution, and is a grayscale image, and accordingly a (448, 448, 1) arrangement information set is input as the compressed image 609 to the convolutional neural network 610.

Processing in the training phase in the second embodiment example is otherwise the same as the processing described in the first embodiment example. In addition, the estimation phase in the second embodiment example is also similarly different from that in the first embodiment example only in that the information amount reducing unit 24 generates the compressed image 803 by reducing the color information of the input image 801 and inputs the compressed image 803 to the trained model 804.

Note that, in the second embodiment example, it was possible to obtain a numerical value of 37.8% as the mean absolute percentage error serving as the index for evaluating the accuracy of the estimation result.

Third Embodiment Example

As a third embodiment example corresponding to a specific example of the first embodiment, a description will be given of an example which is among examples each using the compressed image (wide-area image) obtained by reducing the resolution of the input image in the information processing apparatus 1 according to the first embodiment example and is different from the first embodiment example. Note that the following will describe only a difference between the third embodiment example and the first embodiment example, and a description of details of the third embodiment example that are the same as those of the first embodiment example is omitted.

Figure 9:
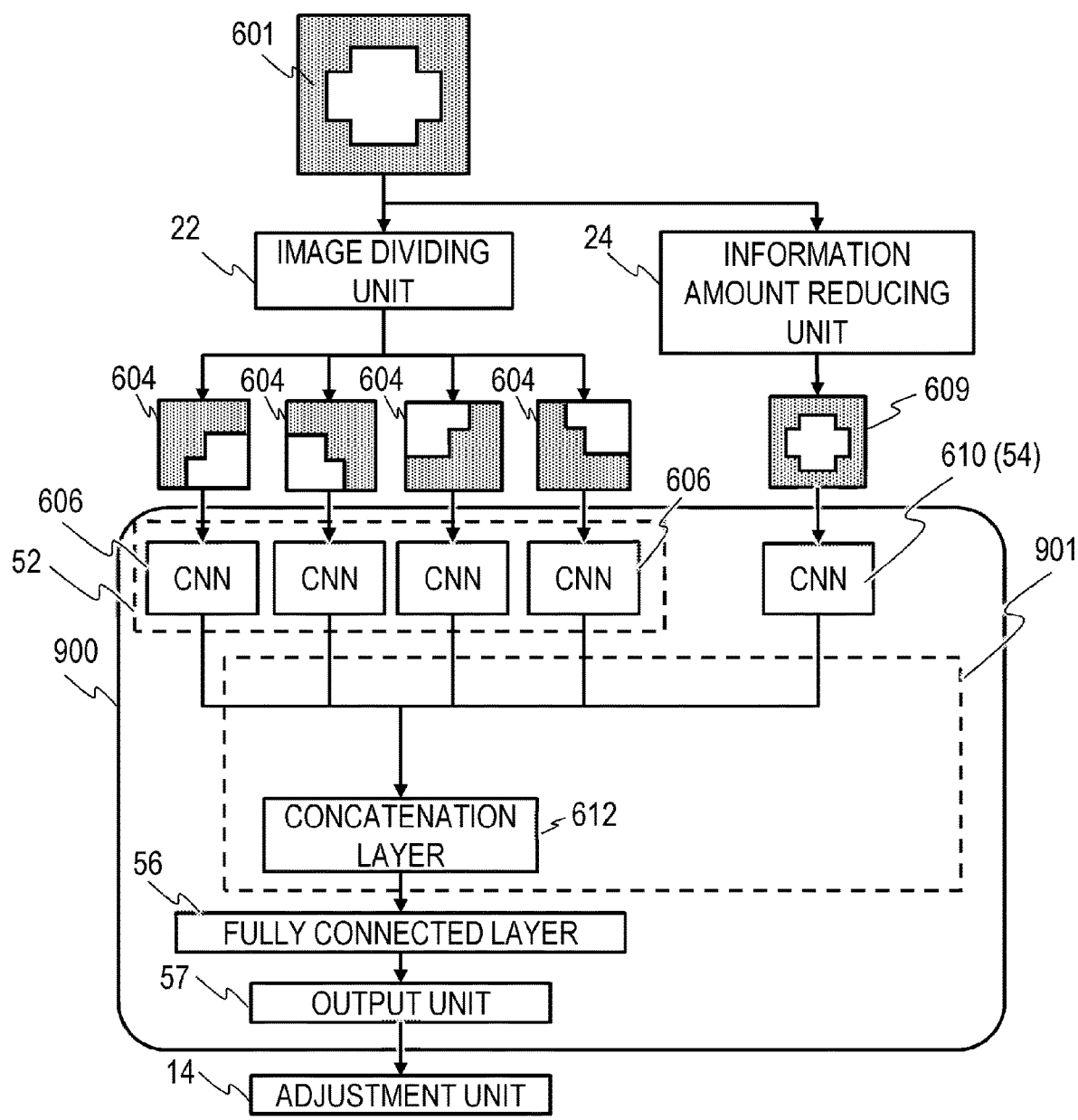
FIG. 9 is a diagram illustrating a training phase according to a third embodiment example.

First, referring to FIG. 9, a description will be given of a training phase as a phase in which a learning model 900 included in the information processing apparatus 1 is to be trained. The third embodiment example is different from the first embodiment example only in that a data concatenating unit 901 of the learning model 900 is present instead of the data concatenating unit 55 of the learning model 50 according to the first embodiment example. Therefore, the following will describe only the data concatenating unit 901 in detail, and a description of other components is omitted.

Unlike the data concatenating unit 55 according to the first embodiment example, the data concatenating unit 901 includes none of the pooling layer 607 and the fully connected layers 608 and 611. In addition, the arrangement information sets output from the four convolutional neural networks 606 and from the convolutional neural network 610 are fully connected in the concatenation layer 612. As a result, the number of features of the divided images 604 included in an arrangement information set output from the concatenation layer 612 is larger than the number of features of the compressed image 609 included in the arrangement information set output from the concatenation layer 612. Therefore, in a case where the detailed features of the input image 601 are to be particularly emphasized in the estimation, when the third embodiment example is used, the accuracy of the estimation is improved compared to that in the first embodiment example. Moreover, since the pooling layer 607 and the fully connected layers 608 and 611 can be removed from the learning model, it is possible to reduce cost of calculation using the learning model.

Meanwhile, in the estimation phase, in the same manner as in the first embodiment example (see FIG. 8), the divided images 802 and the compressed image 803 are input to the learning model 900 trained in the training phase to allow the estimated working time to be obtained from the learning model 900.

Note that, in the third embodiment example, it was possible to obtain a numerical value of 34.6% as the mean absolute percentage error serving as the index for evaluating the accuracy of the estimation result.

Comparative Example

Figure 10:
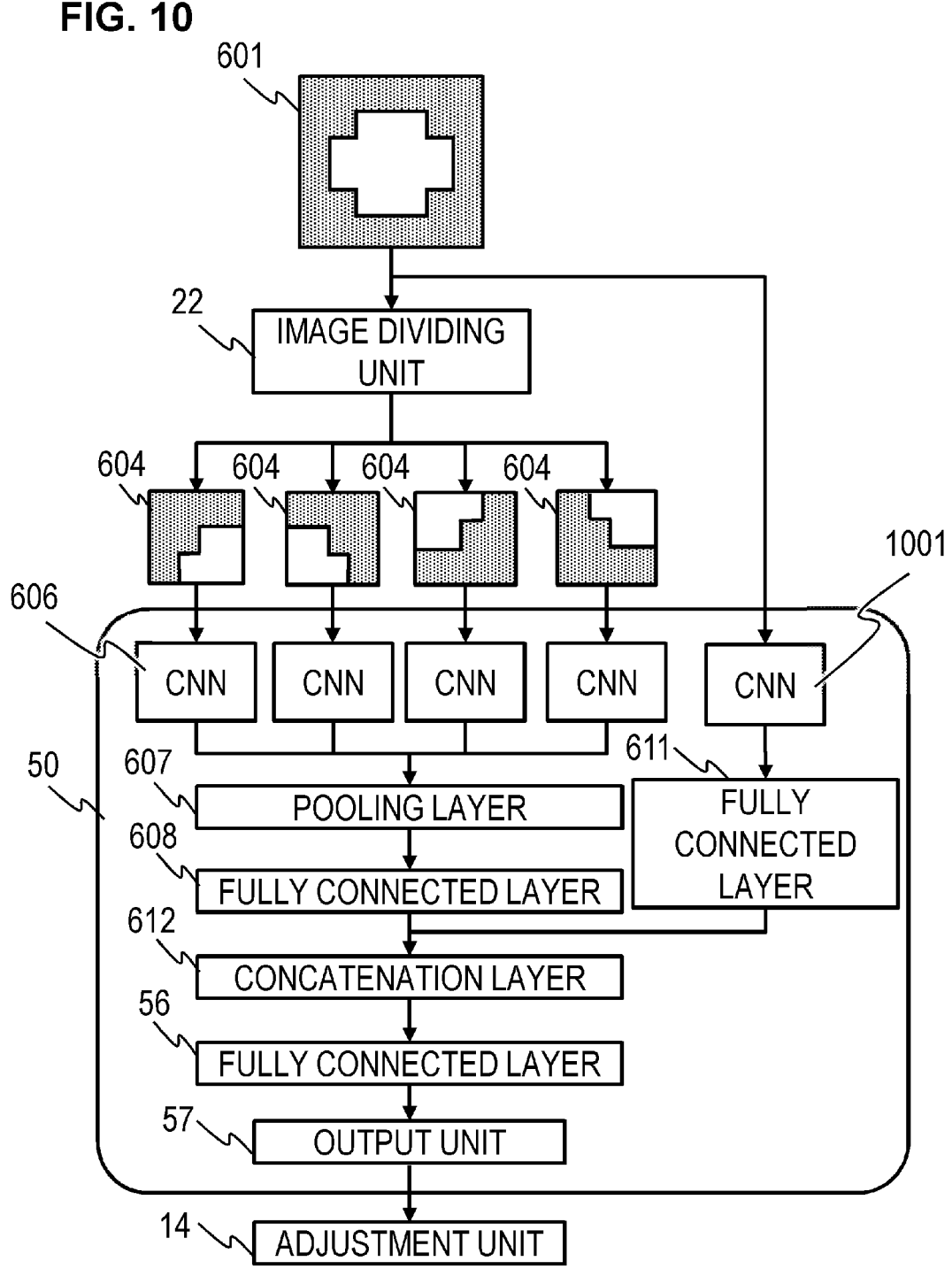
FIG. 10 is a diagram illustrating a training phase according to a comparative example.
Figure 11:
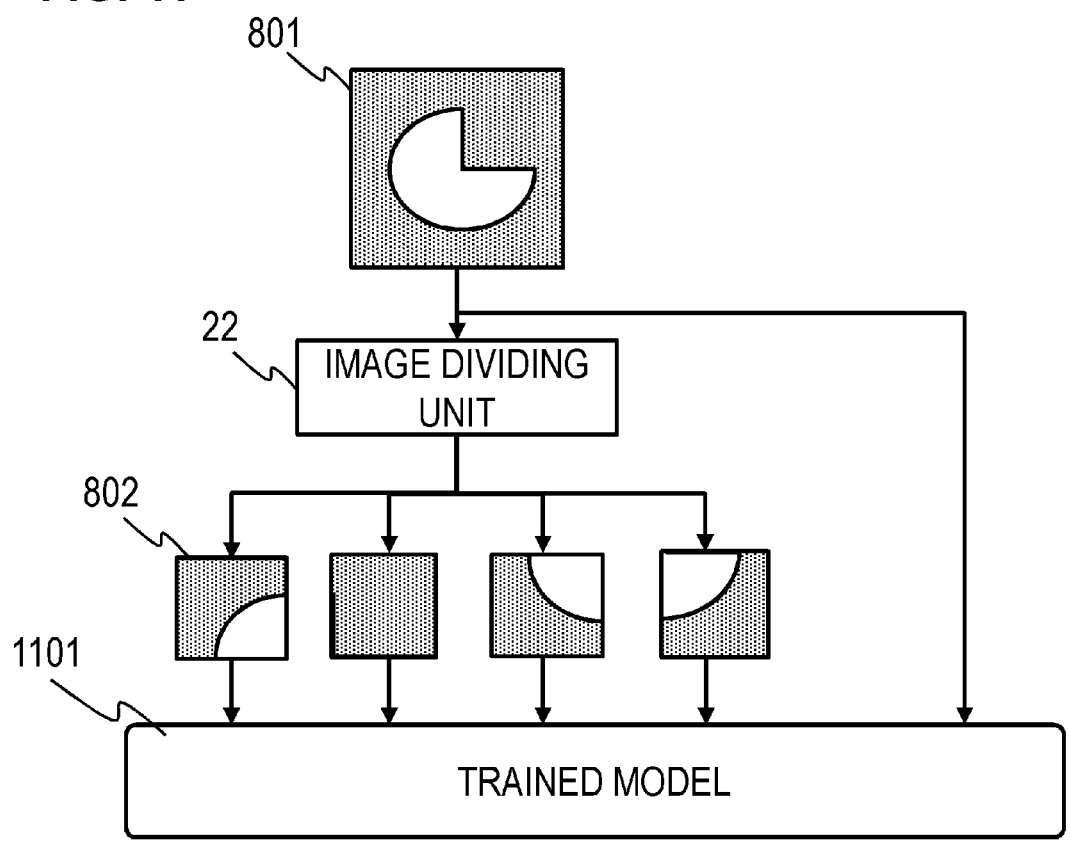
FIG. 11 is a diagram illustrating an estimation phase according to the comparative example.

Referring to FIGS. 10 and 11, a description will be given of evaluation of the accuracy of the estimation result when the information amount of the input image is not reduced as an example to be compared to the first to third embodiment examples. Note that, in FIGS. 10 and 11, components denoted by the same reference numerals as those in FIGS. 6 and 8 are the same as the components in the first embodiment example, and therefore a detailed description thereof is omitted.

FIG. 10 is a diagram illustrating a training phase when the information amount of the input image 601 is not reduced.

In the present comparative example, the information amount reducing unit 24 is not present. Accordingly, to a convolutional neural network (CNN) 1001 in the learning model 50, the input image 601 is input as a (448, 448, 3) arrangement information set without incurring the reduction of the information amount of the input image 601. Then, in the convolutional neural network 1001, convolutional processing is performed on the input image 601, and a one-dimensional arrangement information set including 6400 elements is output.

Accordingly, to the convolutional neural network 1001, the input image 601 having the information amount larger than that of the compressed image 609 input to the convolutional neural network 610 according to each of the first to third embodiment examples is input. As a result, in the present comparative example, cost of calculation for performing convolution in the convolutional neural network increases to be higher than in each of the first to third embodiment examples.

Meanwhile, in the estimation phase, as illustrated in FIG. 11, the information processing apparatus 1 uses a trained model 1101 obtained by training the learning model 50 in the training phase to determine the estimation result. In the estimation phase, the four divided images 802 obtained by dividing the input image 801 and the input image 801 having the unreduced information amount are input to the trained model 1101. Accordingly, in the estimation phase according to the present comparative example also, the cost of calculation for performing the convolution in the convolutional neural network similarly increases to be higher than in each of the first to third embodiment examples.

In the present comparative example, it was possible to obtain a numerical value of 40.6% as the mean absolute percentage error serving as the index for evaluating the accuracy of the estimation result. Meanwhile, the mean absolute percentage error in the first embodiment example was 32.4%, the mean absolute percentage error in the second embodiment example was 37.8%, and the mean absolute percentage error in the third embodiment example was 34.6%. Thus, it was successfully confirmed that, by using the image obtained by reducing the information amount of the input image, the accuracy of the estimation result was improved.

Thus, according to the first embodiment (the first to third embodiment examples), in the information processing apparatus that uses the learning model to perform the training or the estimation, it is possible to reduce the cost of calculation in the learning model and improve the estimation accuracy.

Note that, in each of the embodiment and embodiment examples described above, the example in which machine learning using the convolutional neural networks is performed has been described. However, any machine learning using a support vector machine (SVM), linear regression, or the like may also be performed instead. In addition, in the description given above, the training and the estimation have been performed by the one information processing apparatus, but the training and the estimation may also be performed by different separate apparatuses.

The reduction of the information amount of the input image is not limited to the reduction of the resolution or the reduction of the color information. For example, the information amount may also be reduced by reducing the number of bits in a pixel value of each of pixels in the input image.

According to the present invention, when training or estimation is to be performed using a learning model, it is possible to reduce cost of calculation in the learning model and improve estimation accuracy.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-174764, filed on Oct. 26, 2021, which is hereby incorporated by reference herein in its entirety.

What is claimed is:

1. An information processing apparatus comprising:
at least one memory and at least one processor which function as a plurality of units comprising:
(A) an image acquiring unit configured to acquire (1) a plurality of narrow-area images, each of which represents a part of a target image, and (2) a wide-area image which includes a range of the target image larger than that included in each of the plurality of narrow-area images, the wide-area image having an information amount smaller than that of the target image; and
(B) an information acquiring unit configured to acquire information correlated with the target image from a learning model to which (1) the plurality of narrow-area images and (2) the wide-area image are input.

2. The information processing apparatus according to claim 1, wherein the wide-area image is an image obtained by reducing a number of pixels in the target image.

3. The information processing apparatus according to claim 1, wherein the wide-area image is an image obtained by reducing color information of the target image.

4. The information processing apparatus according to claim 1, wherein the wide-area image is an image obtained by reducing a number of bits in a pixel value in the target image.

5. The information processing apparatus according to claim 1, wherein the wide-area image includes ranges of the target image which are respectively and exclusively included in the plurality of narrow-area images.

6. The information processing apparatus according to claim 1, wherein in the learning model, processing on a basis of information obtained by concatenating first information acquired from the plurality of narrow-area images and second information acquired from the wide-area image is executed.

7. The information processing apparatus according to claim 6, wherein the first information is information obtained by combining a plurality of information sets acquired by performing at least convolutional processing on each of the plurality of narrow-area images into one information set, and
wherein the second information is information acquired by performing at least convolutional processing on the wide-area image.

8. The information processing apparatus according to claim 7, wherein an information amount of the first information is smaller than a total information amount of the plurality of information sets before being combined into the one information set.

9. The information processing apparatus according to claim 7, wherein an information amount of the first information is at least an information amount of each of the plurality of information sets before being combined into the one information set.

10. The information processing apparatus according to claim 7, wherein an information amount of the first information is equal to an information amount of the second information.

11. The information processing apparatus according to claim 1, wherein a number of pixels in each of the plurality of narrow-area images is different from a number of pixels in the wide-area image.

12. An information processing apparatus comprising:
at least one memory and at least one processor which function as a plurality of units comprising:
(A) an image acquiring unit configured to acquire (1) a plurality of narrow-area images, each of which represents a part of a target image, and (2) a wide-area image which includes a range of the target image larger than that included in each of the plurality of narrow-area images, the wide-area image being obtained by reducing an information amount of the target image; and
a training unit configured to train a learning model on a basis of (1) the plurality of narrow-area images, (2) the wide-area image, and (3) information correlated with the target image.

13. The information processing apparatus according to claim 12, which satisfies at least one of the following:
(1) the wide-area image is an image obtained by reducing a number of pixels in the target image;
(2) the wide-area image is an image obtained by reducing color information of the target image;
(3) the wide-area image is an image obtained by reducing a number of bits in a pixel value in the target image;
(4) the wide-area image includes a range of the target image that is included in one of the plurality of narrow-area images and not included in all the other narrow-area images; and
(5) a number of pixels in each of the plurality of narrow-area images is different from a number of pixels in the wide-area image.

14. The information processing apparatus according to claim 12, wherein in the learning model, processing on a basis of information obtained by concatenating first information acquired from the plurality of narrow-area images and second information acquired from the wide-area image is executed.

15. An estimation method comprising:
an image acquiring step of acquiring (1) a plurality of narrow-area images, each of which represents a part of a target image, and (2) a wide-area image which includes a range of the target image larger than that included in each of the plurality of narrow-area images, the wide-area image having an information amount smaller than that of the target image; and
an information acquiring step of acquiring information correlated with the target image from a learning model to which (1) the plurality of narrow-area images and (2) the wide-area image are input.

16. The estimation method according to claim 15, wherein the target image is a design image of a manufacturing object, and
wherein the information correlated with the target image is information of a working time of the manufacturing object or manufacturing cost of the manufacturing object.

17. The estimation method according to claim 16, wherein the manufacturing object is a mold.

18. The estimation method according to claim 15, wherein the target image is an image obtained by diagnostic imaging, and
wherein the information correlated with the target image is life-related information.

19. The estimation method according to claim 15, wherein the target image is an image of a living object, and
wherein the information correlated with the target image is a type or a state of the living object, or information on future potential.

20. The estimation method according to claim 15, wherein the target image is an image of a building or furniture, and
wherein the information correlated with the target image is a degree of deterioration of the building or the furniture.

21. The estimation method according to claim 15, wherein the target image is an image of a car or a house, and
wherein the information correlated with the target image is a price of the car or the house.

22. The estimation method according to claim 15, wherein the target image is an image of a tidal current, and
wherein the information correlated with the target image is a fishery yield.

23. The estimation method according to claim 15, wherein the target image is a weather image, and
wherein the information correlated with the target image is weather-related information.

24. The estimation method according to claim 15, wherein the target image is a graph showing previous price fluctuations, and
wherein the information correlated with the target image is a future price.

25. A training method comprising:
an image acquiring step of acquiring (1) a plurality of narrow-area images, each of which represents a part of a target image, and (2) a wide-area image which includes a range of the target image larger than that included in each of the plurality of narrow-area images, the wide-area image being obtained by reducing an information amount of the target image; and
a training step of training a learning model on a basis of (1) the plurality of narrow-area images, (2) the wide-area image, and (3) information correlated with the target image.

26. A computer-readable non-transitory storage medium that stores a program for causing a computer to execute each of the steps of the training method according to claim 25.

27. A computer-readable non-transitory storage medium that stores a program for causing a computer to execute each of the steps of the estimation method according to claim 15.

* * * * *